R. F. Fairlie,
Locomotive.
N° 85,076. Patented Dec. 22, 1868.
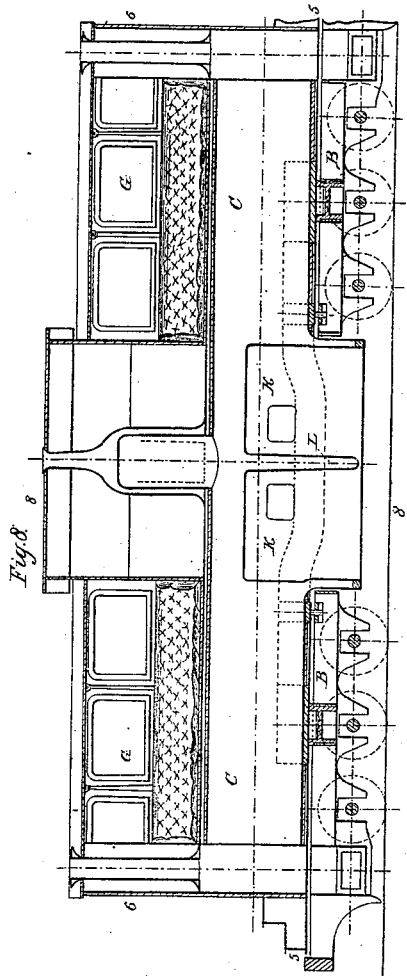
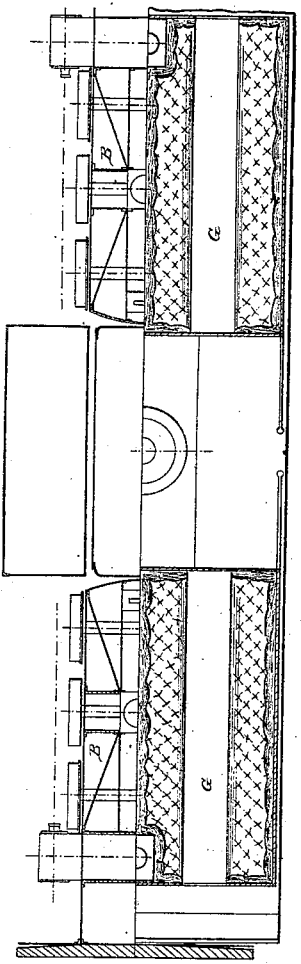
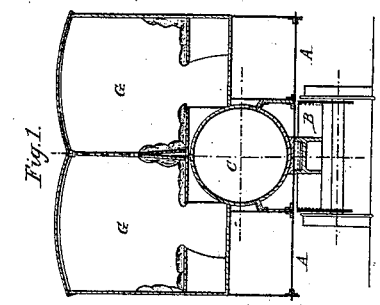
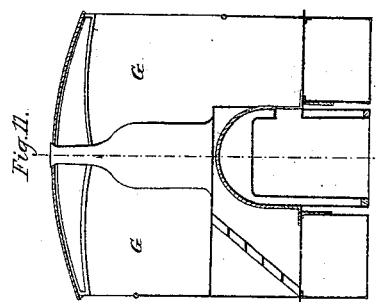
Witnesses. Inventor.

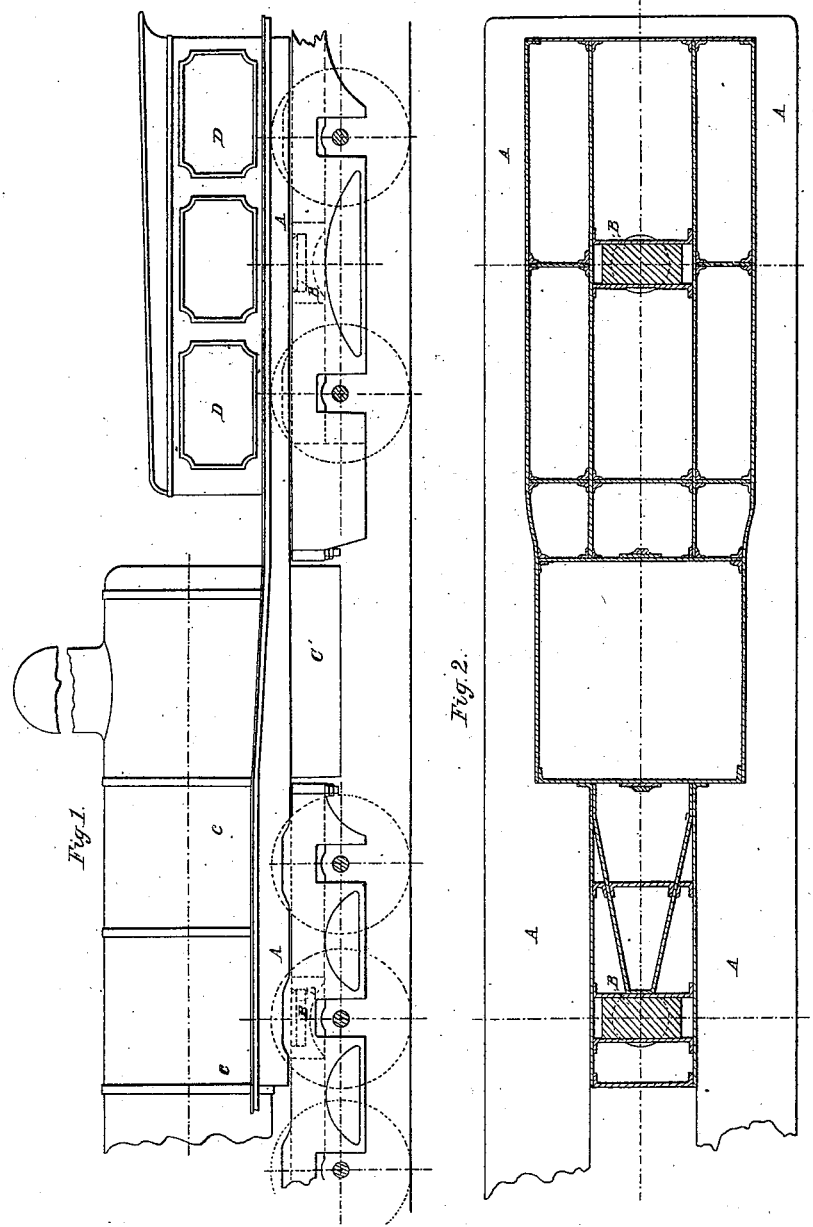

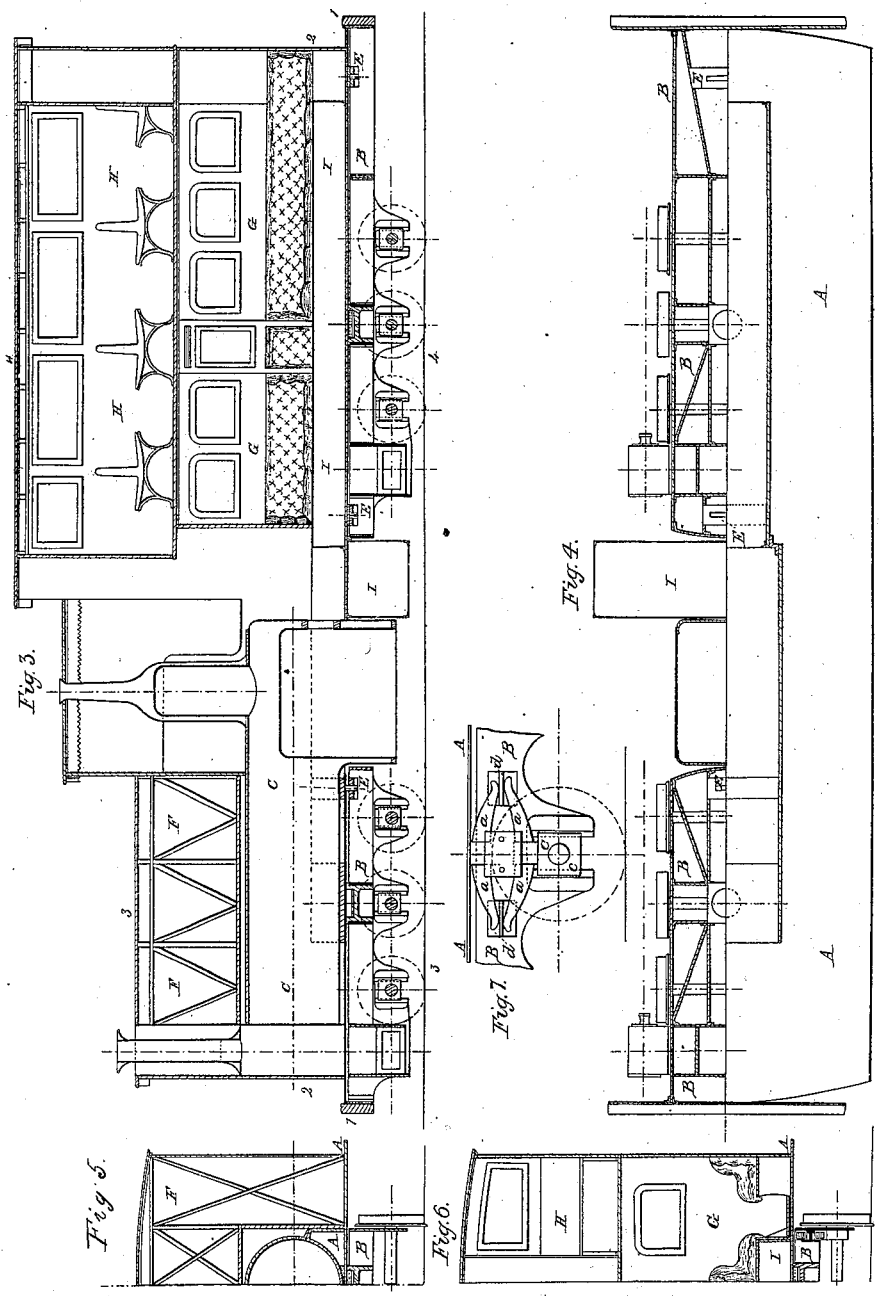

R. F. Fairlie,
Locomotive.
N° 85,076.  Patented Dec. 22, 1868.
4 Sheets—Sheet 4.
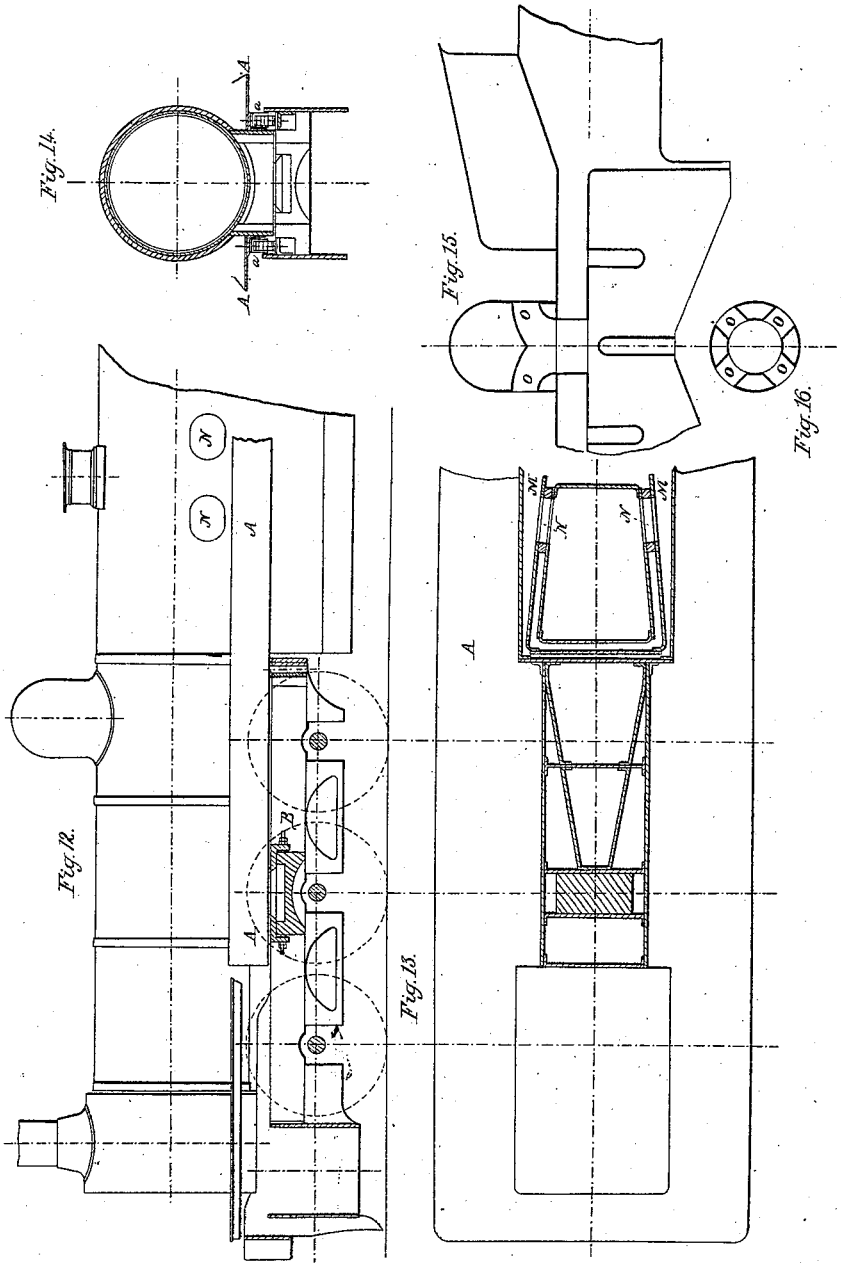
Witnesses..  Inventor.

ROBERT FRANCIS FAIRLIE, OF LONDON, ENGLAND.

Letters Patent No. 85,076, dated December 22, 1868; patented in England, November 14, 1867.

IMPROVEMENT IN LOCOMOTIVE STEAM-ENGINES.

The Schedule referred to in these Letters Patent and making part of the same.

*To all whom it may concern:*

Be it known that I, ROBERT FRANCIS FAIRLIE, of London, England, civil engineer, have invented or discovered certain Improvements in the Construction of Locomotive-Engines, and in combining passenger or goods-compartments therewith; and I do hereby declare that the following is a full, true, and exact description thereof, reference being had to the drawings hereunto annexed; that is to say—

The object of my invention is to so construct the main connecting or carrier-frame of the locomotive-engines, for which I obtained Letters Patent on the 16th day of January, 1866, No. 52,117, that the boiler may be dropped into its place, and remain there without any fastening, except bolts in the angle-irons, hereafter described, and have no connection with the bogie framing except through the steam and exhaust-pipes, the object being to allow the boiler free scope for expansion or contraction, it being considered an essential element in prolonging the life of a boiler, and reducing liability to accident, that it should be free to expand or contract in any direction.

My invention consists in combining, with the frame, water and fuel-reservoirs, also, passenger and goods-compartments, as hereinafter described.

The frame, which I propose to call the carrier or cradle-frame, is a rigid body from end to end, supported on two bogies or swivel-frames, and is made of sufficient strength to withstand all tensile strain or shocks from one bogie-frame to the other, and to maintain a true relative position of one bogie to the other, as if the whole were of one solid mass, at the same time permitting free swivelling-action of the bogie-frames quite independent of each other.

Sometimes I employ coupling-frames between the bogie-frames, as described in my former specification, to give additional strength, or to allow of the carrier-frame being made lighter. The coupling-frames pass below the carrier-frame.

The carrier-frame is furnished with two strong steel pins, which extend downwards, and fit into curved slots in the end of each bogie next the fire-box, the said slots being struck from the centre of the bogie-frames.

Elastic packing, between steel plates, may be interposed between the bottom of the carrier-frame and the top of the bogie-frames, and between the bottom of the bogie-frames and the nuts on the pins, just mentioned, to prevent shocks being transmitted to the boiler.

The bogies have all the working-parts of the engines and the brake-apparatus attached to them.

When a boiler with a single set of tubes is employed, I erect over the cylindrical part thereof, and on the carrier-frame, before described, a strong, roofed framework, to form either a tank or a wagon-body, for the reception of merchandise, or luggage, or any matter or thing requiring to be transported; and upon the after-part of the same frame the body of a carriage is erected, in the form of a saloon, or any other form, to suit the convenience or taste of the builders or users thereof, which may be divided longitudinally or transversely into compartments; or there may be two or more compartments or floors built over each other, forming so many stories, which, in turn, may be divided or subdivided, to suit the exigencies of the traffic, or the classes of persons to be carried.

Instead of a carriage, for the conveyance of passengers, a large wagon, for ordinary live-stock or goods, or brake-van body, or a tank may be erected, for conveying water to towns, or for the accommodation of troops, or other purpose.

The spaces between the main plates of the carrier-frame may be formed into tanks or water-reservoirs, for the supply of the locomotive, or other purpose, which may be covered in, so as to form seats for passengers, or otherwise, as convenience and the class of vehicle to be erected may dictate.

The carrier or cradle-frame is so constructed that the fire-box portion of the boiler passes through it, until the angle-irons, which are riveted along each side of the fire-box shell for this object, obtain a bearing, and rest on the top of the carrier-frame. That portion of the carrier-frame extending under the barrel of the boiler is made of a concave form, suitable to the circumference of the boiler, which rests on the concave part of the frame as in a cradle, the boiler being thus thoroughly supported at all parts, yet free to move by expansion or contraction in any direction.

The angle-irons, just described, may be firmly bolted to the carrier-frame at each side of the fire-box shell, midway of its length, the point from which expansion would commence outwards towards each end. Additional bolts may also be put in these angle-irons and carrier-frame, extending from the centre-bolt to the ends of the angle-irons, the bolt-holes being made oblong, graduating from the centre outwards to about three-eighths of an inch at the outside bolt, beyond its diameter, to permit of free expansion.

The foot-plate, for the "driver," may be placed in a line with or over a portion of the top of the boiler, or it may be placed in the usual position behind the fire-box, with the means of looking out ahead at the top and at the sides, or with either.

The foot-plate for the stoker or fireman is placed, as usual, with coal-bunkers convenient on each side of him, to enable him readily to feed his fire.

The coal-space is arranged partly under the driver's foot-plate and on either side of the boiler.

The steam-pipes pass from the steam-dome, in the usual manner, to the frames near the cylinders, where they are connected to T-shaped pipes, the arms of the T being curved to a radius struck from the centre of the bogie-pin, and are free to slide in the ends of the other pipes, also curved, attached to the cylinders or steam-chests, these last-mentioned pipes being fitted with stuffing-boxes and glands, to prevent escape of steam at the joints.

From the construction of the frame, as before explained, great rigidity and strength can be given to it; it in fact forms a girder between the two bogie-centres, through which the whole force of one bogie-truck is transmitted to the other. Any required space may therefore be left between the two trucks for the fire-box, which may consequently be made of any desired size. A greater heating-surface is thus obtained, and the length or size of the boiler can be increased.

By the arrangement above described, I am enabled to combine a locomotive, a fuel-carrier, a passenger-carriage, suitable for three classes of passengers, all in one floor, or in two or more floors placed one over the other, and a luggage-truck on the same framing, the combined weight of which insures the bite of the wheels upon the rails, and thereby increasing the power of the engine, by increasing its adhesion; in fact making every passenger and every ton of goods assist the engine to haul them.

An engine or structure, built and arranged as above described, with a "bogie-truck" at each end, is especially applicable for mountain passes, and for railways having a number of sharp curves, or for working on rails laid on ordinary roads; or for light passenger-traffic, not requiring so much adhesion, the power may be applied to one bogie-truck only.

By making that portion of the carrier-frame upon which the passenger-carriages would be erected, as described, into a frame exactly similar to that in which the boiler rests, a double-barrelled boiler may be used. The two boiler-barrels are attached, in the usual manner, to a central fire-box casing or shell, into which two distinct fire-boxes are placed, or one large box may be used, with a transverse water-partition across its centre, thus forming two separate boxes, the products of combustion from these fire-boxes being compelled to pass through the tubes in the barrel connected with each box, and therefore keeping the draughts from the two boxes entirely distinct and separate from each other.

The boilers may be furnished with funnels, and steam and exhaust-pipes at each end of the locomotive, or return-tubes or flues may be fitted in the steam-space over the fire-box, so as to lead the products of combustion back through the boiler to one central funnel, as described in my first patent.

Carriage-bodies, for passengers, or truck-bodies, for luggage or merchandise, may be fitted on the frame and carried up above the boilers in a similar manner to the truck for merchandise or luggage before described.

My invention will be fully understood by the accompanying drawings.

Figure 1 is a side elevation, showing my rigid carrier or cradle-frame, with a boiler and fuel and water-bunkers or tanks placed thereon.

Figure 2 is a plan of the carrier-frame by itself.

A A are the carrier-frame, which, as before mentioned, is a rigid body from end to end.

It is supported on two bogies or swivel-frames, the centres of which are indicated at the points marked B B.

C is the boiler, which is dropped into the frame A.

The frame A is so constructed that the fire-box portion C' of the boiler passes through it, as seen in fig. 1, until the angle-irons, riveted along each side of the fire-box, shall rest upon the top of the frame A, and may be bolted thereto, as before described. That portion of the frame A which extends under the barrel of the boiler, is concave, to receive the barrel as in a cradle. The boiler is thus thoroughly supported at all parts, yet free to move, by expansion or contraction, in any direction.

D is the fuel-bunker, which is dropped or placed upon the after part of the frame A.

In figs. 3 to 6, I show the mode in which I combine a compartment for merchandise or luggage and a passenger-carriage with my rigid carrier-frame.

Figure 3 is a longitudinal section;

Figure 4, a horizontal section, partly through the line 1–1 and partly through the line 2–2 of fig. 3;

Figure 5 is a transverse section through the line 3–3; and

Figure 6, a transverse section through the line 4–4 of fig. 3.

These figures also show the bogies and the locking-apparatus; also the spaces for containing a supply of water.

A A are the carrier-frame.

B B, the bogies.

C, the boiler.

E E, the locking-apparatus for the bogies.

F is a strong, roofed frame-work, forming a compartment, for luggage or merchandise.

G is a carriage, erected on the after part of the frame A. It is divided longitudinally into two compartments. It has also built over it a second carriage, H, which may also be divided longitudinally.

The spaces I I, between the main plates of the frame A A, form water-reservoirs, to supply the locomotive, or otherwise. They are covered in, and form the seats for the passengers in the carriage G, as clearly seen in fig. 6. They also form the foot-plates for the driver and stoker.

Figure 7 is a detached view, showing an arrangement for preventing violent jolting or concussion.

Instead of the boiler and carriages resting directly upon the rigid carrier-frame A, they carry springs, $a$, on their under side, which bear upon other springs, $b$, on the bogies, which latter springs may bear upon the axle-boxes $c$, a plate, $d$, being fitted between every pair of springs $a\ b$, to allow for the swivelling motion of the bogies.

Figs. 8 to 11 represent a double-barrelled boiler placed upon my carrier-frame;

Figure 8 is a longitudinal section;

Figure 9, a horizontal section, partly through the line 5–5 and partly through the line 6–6 of fig. 8;

Figure 10 is a transverse section through the line 7–7; and

Figure 11, a transverse section through the line 8–8 of fig. 8.

A A are the carrier-frame, and

B B, the bogies.

C C are the two boiler-barrels, attached to each other at the fire-box end.

There is one fire-box, K, with a transverse water-partition, L, which forms, as it were, two fire-boxes, from which the products of combustion pass through the tubes of the respective barrels C C.

There is a passenger-carriage, G, erected above each barrel.

Figures 12 and 13 represent the manner in which a double-barrelled boiler (without passenger-compartments) is mounted on a rigid carrier-frame, A.

The fire-boxes are bayed or recessed at each side, (or they may be bayed at one side only,) as seen at M M, to give more standing-room for the driver and the stoker, and to facilitate the supply of fuel to the fire. The fuel may be fed from both sides or from either side.

Figure 14 represents springs, $a\ a$, on the under side of the boiler, and resting directly upon the frame A, and with the same object as before described in reference to the springs shown in fig. 7.

In figs. 12 and 13, N N are apertures at the sides, through which the fuel is fed.

In Figure 15 I represent a novel mode of feeding the fuel at the top, through apertures O O in the dome, these apertures being provided with doors.

Figure 16 is a horizontal section of the dome.

What I claim as my invention, and desire to secure by Letters Patent, is—

1. The rigid carrier or cradle-frame A, supported on the bogies or swivel-frames B, to which the engines are attached, the said frames being constructed substantially in manner herein described and shown.

2. The combination of the rigid frame, bogie-frames, and a coupling-frame between the bogies, as and for the purpose herein described.

3. The combination, with the rigid frame A and bogies B, of the boiler C, which is dropped into its place and bolted only at the centre of the fire-box, free scope for expansion and contraction being thus permitted, substantially as herein described and shown.

4. The combination, with the rigid frame A, bogies B, and boiler C, of the fuel-carrier D, substantially as herein described and shown.

5. The combination, with the rigid frame A, bogies B, and engines mounted thereon, and boiler C, of the luggage or merchandise-compartment F, substantially as herein described and shown.

6. The combination, with the rigid frame A, bogies B supporting the engines, and boiler C, of the passenger-carriages G H substantially as herein described and shown.

7. The combination, with the rigid frame A, bogies B, and boilers C, of the water-spaces I I, substantially as herein described and shown.

8. The combination, with the rigid frame A and bogies B, supporting the engines, of the springs $a$ and $b$, substantially as herein described and shown.

9. The combination, with the rigid frame A and bogies B, of a double-barrelled boiler, the fire-boxes of which are fed through apertures O O in the dome, substantially as herein described and shown.

In witness whereof, I, the said ROBERT FRANCIS FAIRLIE, have hereunto set my hand, this 9th day of April, 1868.

ROB'T F. FAIRLIE.

Witnesses:
THO'S J. SMITH, 166 *Fleet Street London.*
I. C. NEWBURN, 166 *Fleet Street, London.*